US011124941B2

(12) United States Patent
Benevelli et al.

(10) Patent No.: US 11,124,941 B2
(45) Date of Patent: Sep. 21, 2021

(54) MOTOR GRADER WITH COMFORT STEERING

(71) Applicant: CNH Industrial America LLC, New Holland, PA (US)

(72) Inventors: Alessandro Benevelli, Albinea (IT); Domenico Meola, Lauriano (IT); Davide Antonucci, Turin (IT)

(73) Assignee: CNH Industrial America LLC, New Holland, PA (US)

( * ) Notice: Subject to any disclaimer, the term of this patent is extended or adjusted under 35 U.S.C. 154(b) by 133 days.

(21) Appl. No.: 16/370,451

(22) Filed: Mar. 29, 2019

(65) Prior Publication Data

US 2019/0301130 A1    Oct. 3, 2019

(30) Foreign Application Priority Data

Mar. 29, 2018    (IT) .......................... 102018000004096

(51) Int. Cl.
*E02F 3/84*      (2006.01)
*B62D 12/00*   (2006.01)
*E02F 3/76*      (2006.01)
*E02F 9/20*      (2006.01)
*G05G 9/047*   (2006.01)
(Continued)

(52) U.S. Cl.
CPC ................ *E02F 3/841* (2013.01); *B62D 9/00* (2013.01); *B62D 12/00* (2013.01); *E02F 3/764* (2013.01); *E02F 3/7636* (2013.01); *E02F 3/84* (2013.01); *E02F 9/2004* (2013.01);
(Continued)

(58) Field of Classification Search
CPC . E02F 3/841; E02F 9/2087; E02F 3/84; E02F 3/764; E02F 3/7636; E02F 9/2004; E02F 9/0841; B62D 9/00; B62D 12/00; G05G 9/047
See application file for complete search history.

(56) References Cited

U.S. PATENT DOCUMENTS 3,527,314 A    9/1970  Hampton
3,527,315 A    9/1970  Hampton
(Continued)

OTHER PUBLICATIONS

Extended European Search Report for EP Application No. 19163651.3 dated Jun. 3, 2019 (seven pages).

*Primary Examiner* — James A English
*Assistant Examiner* — Kurtis Nielson
(74) *Attorney, Agent, or Firm* — Peter Zacharias; Patrick Sheldrake

(57) ABSTRACT

A motor grader having an articulated frame that includes a first front frame portion and a second rear frame portion that is angularly moving with respect to the first frame portion around a pivoting axis. A front steering system includes front wheels that are movable around a steering axis with respect to the articulated frame and around leaning axis transversal to the steering axis so that the front wheels may turn and lean during steering operation. A control unit receives as an input a control signal representing a steering angle and outputs steering actuation commands for an hydraulic actuating system of the front steering system and for a hydraulic actuating system of the articulated frame realizing synchronized and proportional angular movements of the front wheels around the steering and leaning axes and of the first and second portions of the frame around the pivoting axis.

9 Claims, 3 Drawing Sheets

(51) Int. Cl.
*B62D 9/00* (2006.01)
*E02F 9/08* (2006.01)

(52) U.S. Cl.
CPC ........... *E02F 9/2087* (2013.01); *G05G 9/047* (2013.01); *E02F 9/0841* (2013.01)

(56) References Cited

U.S. PATENT DOCUMENTS

| | | | | |
|---|---|---|---|---|
| 4,423,785 | A * | 1/1984 | Kurihara | B23Q 15/12 |
| | | | | 172/3 |
| 5,584,346 | A * | 12/1996 | Sakamoto | E02F 9/2004 |
| | | | | 172/4.5 |
| 6,152,239 | A * | 11/2000 | Kelley | E02F 3/841 |
| | | | | 172/4.5 |
| 9,227,478 | B2 * | 1/2016 | Horstman | B60G 1/02 |
| 2007/0250236 | A1 * | 10/2007 | Newberry | E02F 9/2045 |
| | | | | 701/51 |
| 2012/0150390 | A1 | 6/2012 | Ruhter et al. | |
| 2012/0160526 | A1 * | 6/2012 | Padilla | E02F 3/765 |
| | | | | 172/4.5 |
| 2013/0192919 | A1 * | 8/2013 | Subrt | B62D 6/002 |
| | | | | 180/400 |
| 2014/0041884 | A1 * | 2/2014 | Zhu | E02F 9/2087 |
| | | | | 172/2 |
| 2015/0259882 | A1 | 9/2015 | Sharma et al. | |
| 2016/0362870 | A1 * | 12/2016 | Elkins | E02F 3/844 |
| 2017/0066324 | A1 * | 3/2017 | Hertel | B60K 28/16 |
| 2017/0114521 | A1 * | 4/2017 | Wuisan | E02F 3/844 |
| 2017/0114523 | A1 | 4/2017 | Horstman et al. | |
| 2019/0063035 | A1 * | 2/2019 | Yamaguchi | B60G 1/02 |
| 2020/0173141 | A1 * | 6/2020 | Gentle | E02F 3/815 |
| 2021/0032850 | A1 * | 2/2021 | Holl | E02F 9/2029 |

* cited by examiner

MOTOR GRADER WITH COMFORT STEERING

BACKGROUND OF THE INVENTION

A grader, also commonly referred to as a road grader or a motor grader, is a construction machine with a long blade used to create a flat surface during the road grading process. The motor grader is a quite complex vehicle with three independent steering actuations.

In fact, typically, a motor grader has an articulated frame comprising a first front frame portion provided with a front steering system and carrying a transverse blade that is used to create a flat surface during road grading process and a second rear frame portion that may be angularly moved with respect to the first frame portion around a pivoting axis and that is provided with power rear wheels. Normally the second rear frame portion also carries the cabin of the driver and the engine.

The front steering system comprises a couple of wheels that are movable around a steering axis with respect to the articulated frame; the steering system also enables the front wheels to modify their angular position with respect to a leaning axis transverse to the steering axis so that the front wheel may also lean during steering. This function has been created in order to facilitate the steering of the motor grader off-road and on inclined surfaces.

SUMMARY OF THE INVENTION

The present invention is focused to further improve the steering capabilities of a motor grader so that a steering operation will include a reduced number of steering turns with respect to the number of turns necessary for a prior-art grader so that the driving comfort and the steering maneuverability of the motor grader will be improved.

The above effect is obtained by the present invention is focused to a motor grader wherein an articulated frame comprises a first front frame portion provided with a front steering system and carrying a transverse blade that is used to create a flat surface during road grading process and a second rear frame portion that is connected in a pivoting manner, is provided with rear power wheels and is angularly moving with respect to the first frame portion around a pivoting axis; the front steering system comprises a couple of front wheels that are movable around a steering axis with respect to the articulated frame; the steering system also enables the front wheels to modify their angular position with respect to a leaning axis transverse to the steering axis so that the front wheels may also lean during steering operation, characterized by comprising a control unit that receives as an input a control signal representing a steering amount (St) required by the driver of the motor grader and outputs steering actuation commands for an hydraulic actuating system of the front steering system and for an hydraulic actuating system of the articulated frame realizing synchronized and proportional angular movements of the front wheels around the steering axis, of the front wheel around the leaning axis and of the first portion of the frame with respect to the second portion of the frame around the pivoting axis.

BRIEF DESCRIPTION OF THE DRAWINGS

The invention will be described with the attached drawings that represent an exemplary not-limiting example of the invention wherein.

DETAILED DESCRIPTION OF THE INVENTION

Figure 1:
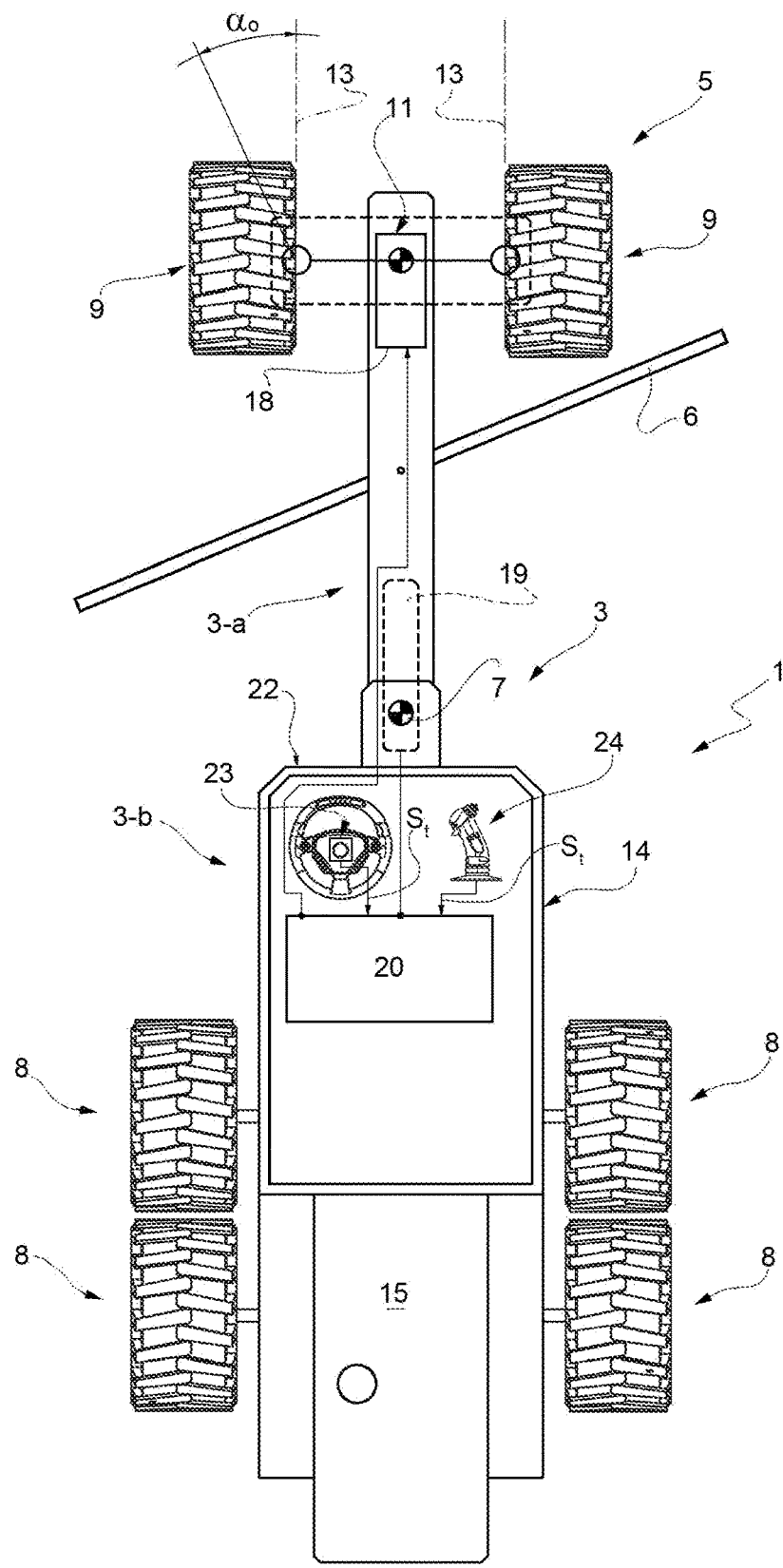
FIG. 1 shows schematically a top view of a motor grader according to the present invention.

FIG. 1 shows a motor grader 1 having an articulated frame 3 that comprises a first front frame portion 3-$a$ provided with a front steering system 5 and carrying a transverse blade 6 that is used to create a flat surface during aroad grading process. The articulated frame 3 also comprises a second rear frame portion 3-$b$ that is connected in a pivoting manner such that it is angularly movable with respect to the first frame portion 3-$a$ around a pivoting axis 7. The rear portion 3-$b$ comprises a number of rear power wheels 8, such as four rear power wheels 8 in the example illustrated. The front steering system 5 comprises a couple or pair of front wheels 9 that are movable around a steering axis 11 with respect to the articulated frame 3; the steering system 11 also enables the front wheels 9 to modify their angular position with respect to the vertical direction around a leaning axis 13 transverse to the steering axis 11 so that the front wheels 9 may also lean during steering operations. The rear frame portion 3-$b$ also carries the cabin 14 for the driver and the engine 15.

The front steering system 5 is provided with an hydraulic actuating system 18 (of a known kind, shown schematically) to realize the synchronized movement of the front wheels 9 around steering axis 11 and around leaning axis 13. The actuating system 18 receives control signals arriving from a control unit 20 that will be described later.

The frame 3 is also provided with an hydraulic actuating system 19 (of a known kind) to realize the angular displacements of the front frame 3-$a$ with respect to the rear frame 3-$b$. Also the actuating system 19 receives control signals arriving from the control unit 20.

According to the present invention, the control unit 20 receives as an input a control signal representing a steering amount (St) required by the driver of the motor grader and outputs steering actuation commands for the hydraulic actuating system 18 of the front steering system 5 and for the hydraulic actuating system 19 of the articulated frame 3 realizing synchronized and proportional angular movements of angular movement $\alpha$ of the front wheels 9 around the steering axis 11, of angular movement $\beta$ of the front wheels 9 around the leaning axis 13, and of angular movement $\omega$ of the first portion of the frame 3-$b$ with respect to the second portion of the frame 3-$b$ around the pivoting axis 7.

According to a first embodiment, the steering wheel 22 of the motor grader is provided with an angular sensor 23 measuring the turns of the steering wheel 22; the sensor 23 produces the control signal St.

Figure 3:
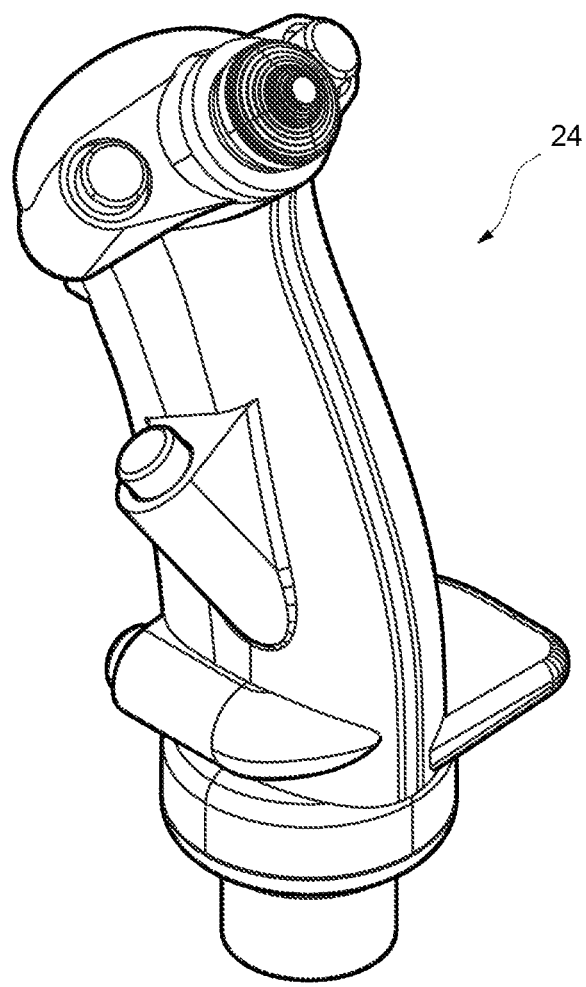
FIG. 3 shows a joystick used in the motor grader.

According to a second embodiment, the front steering system is operated by a joystick 24 (see also FIG. 3) so that the driver may turn left and right by inclining of the joystick 24; in this case the joystick 24 produces the control signal St.

Figure 2:
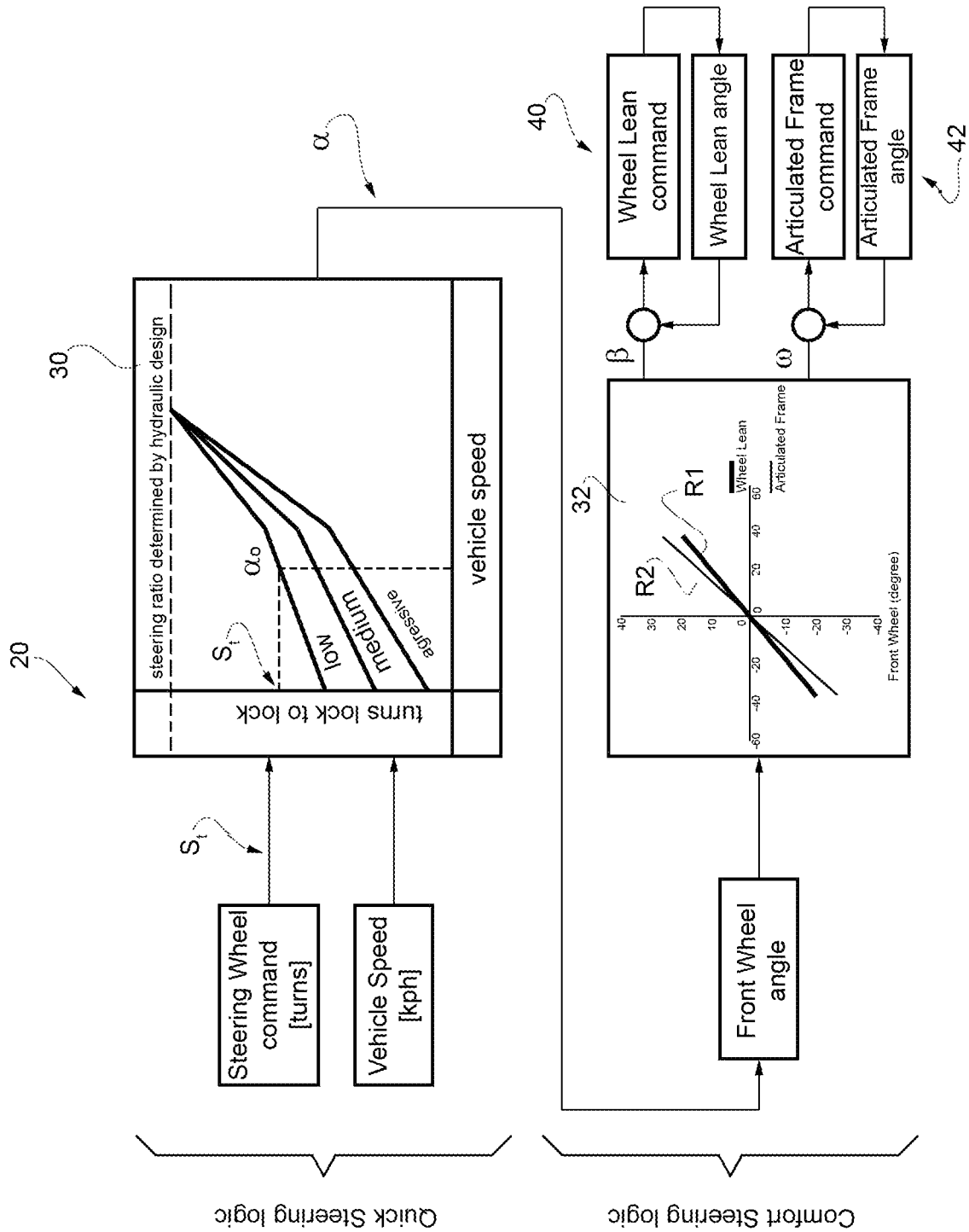
FIG. 2 shows the control logic of the motor grader according to the present invention.

FIG. 2 shows the detail of the control unit 20.

Control unit 20 comprises:

a first controller 30 that receives at its inputs the control signal St representing the steering amount St and the measured speed of the motor grader 1; the first controller 30 outputs for each couple of inputs the value $\alpha_0$ of a steering angle $\alpha$ that realizes a command for the hydraulic system 18 of the front steering system 5 that consequently rotates the front wheels 9 by the calculated value $\alpha_0$;

a second controller 32 that receives as input the measured angle $\alpha$ that has been implemented by the front steering system 5 and that produces the value $\beta_0$ of a leaning angle $\beta$ that realizes a command for the hydraulic system 18 of the front steering system 5 that consequently rotates the front wheels 9 by the calculated value $\beta_0$;

the second controller 32 also produces the value $\omega_0$ of a rotating angle $\omega$ that realizes a command for the hydraulic system 19 of the articulated frame 3 that consequently rotates the front frame 3-*a* with respect to the rear frame 3-*b* by the calculated value $\omega_0$.

Preferably the first controller 30 comprises a table establishing the relationship (represented in the exemplary drawings with a linear relationship, i.e. a line, but the relationship may be of different kind) between the input a control signal St representing a steering amount and the signal representing the speed of the motor grader 1.

According to a preferred embodiment the first controller 30 comprises a table establishing a number of different relationships between the input a control signal St representing a steering amount and the signal representing the speed of the motor grader; the relationships been selectable by the user depending on a desired driving style (low, medium and aggressive for instance).

Preferably the second controller 32 comprises a table establishing a first relationship (represented in the drawings with a linear relationship, i.e. a first line R1, but the relationship may be of different kind) between the steering angle $\alpha$ and the leaning angle $\beta$ and a second relationship (represented in the drawings with a linear relationship, i.e. a second line R2, but the relationship may be of a different kind) between the steering angle $\alpha$ and the rotating angle $\omega$.

According to the above logic when the driver will rotate the steering wheel 22 to realize the steering $\alpha_0$ of front wheels 9 the front wheels 9 will also lean of a proportional amount $\beta_0$ and the articulated frame 3 will also rotate around the pivoting axis 7 of a proportional amount $\omega_0$.

The set values of $\beta_0$ and $\omega_0$ are controlled by respective closed loop control of a kind type 40 and 42 (shown schematically).

The above logic strongly improves the driving comfort and the steering maneuverability of the motor grader 1 reducing the vehicle turning radius automatically when this control logic is engaged.

The above logic may be enabled/disabled by a manual command, for instance a manual command provided by pushing a button on the joystick 24.

The above logic may have a total reset function wherein, following a reset command (this function may also defined as "combined return to center") provided by pushing a button on the joystick 24 (FIG. 3), the current values $\alpha_0$ $\beta_0$ $\omega_0$ and of a steering angle $\alpha$, of the leaning angle $\beta$ and of the rotating angle $\omega$ are set to zero.

The above logic may have a partial reset function wherein, following the selection of the above "combined return to center" function provided by pushing a button on the joystick 24, one or more of the current values $\alpha 0$ $\beta 0$ $\omega 0$ and of a steering angle $\alpha$, of the leaning angle $\beta$ and of the rotating angle $\omega$ are set to zero.

What is claimed is:

1. A motor grader comprising:
   an articulated frame including:
   a first front frame portion provided with a front steering system and carrying a transverse blade, the transverse blade being usable that is used to create a flat surface during a road grading process, the front steering system including a pair of front wheels pivotable around a steering axis relative to the articulated frame during a steering operation and pivotable around a leaning axis transverse to the steering axis so that the pair of front wheels may lean during the steering operation; and
   a second rear frame portion pivotably connected to the first frame portion, the second rear frame portion being pivotable around a pivoting axis relative to the first front frame portion;
   rear power wheels; and
   a control unit configured to:
   receive a control signal representing a steering amount (St) requested by a driver of the motor grader; and
   control, in response to receiving the control signal, a hydraulic actuating system of the front steering system and a hydraulic actuating system of the articulated frame to proportionally:
   pivot the pair of front wheels around the steering axis,
   pivot the pair of front wheels around the leaning axis, and
   pivot the first front frame portion around the pivoting axis relative to the second rear frame portion.

2. The motor grader as claimed in claim 1, further comprising a steering wheel and an angular sensor, the angular sensor measuring angular rotation of the steering wheel,
   wherein the control signal (St) is received from the angular sensor.

3. The motor grader as claimed in claim 1, wherein the control signal (St) is received from a joystick associated with the front steering system, the joystick configured to produce the control signal St in response to inclination of the joystick by the driver.

4. The motor grader as claimed in claim 1, wherein the control unit comprises:
   a first controller, the first controller being configured to receive that receive the control signal representing the steering amount (St) and a speed of the motor grader, determine a steering angle ($\alpha$) based at least in part on the control signal, and control the hydraulic system of the front steering system to pivot the pair of front wheels by the steering angle ($\alpha$) around the steering axis; and
   a second controller, the second controller being configured to receive the steering angle ($\alpha$), determine a leaning angle ($\beta$) and a pivoting angle ($\omega$) based at least in part on the steering angle ($\alpha$), control the hydraulic system of the front steering system to pivot the pair of front wheels by the leaning angle ($\beta$) around the leaning axis, and control the hydraulic system of the articulated frame to pivot the front frame by the pivoting angle ($\omega$) about the pivoting axis relative to the rear frame.

5. The motor grader as claimed in claim 4, wherein the first controller establishes a pre-defined relationship between the control signal representing the steering amount (St) and the speed of the motor grader.

6. The motor grader as claimed in claim 4, wherein the first the first controller comprises a table establishing a number of different pre-defined relationships between the control signal representing the steering amount (St) and the speed of the motor grader, the relationships being selectable by the driver depending on a desired driving style.

7. The motor grader as claimed in claim 4, wherein the second controller comprises a table establishing a first pre-defined relationship (R1) between the steering angle (α) and the leaning angle (β) and a second pre-defined relationship (R2) between the steering angle (α) and the rotating angle (ω).

8. The motor grader as claimed in claim 4, wherein the control unit is further configured to implement a total reset function wherein, following a reset command provided by the driver, the control unit sets the steering angle (α), the leaning angle (β), and the rotating angle (ω) to zero according to a combined return to center function.

9. The motor grader as claimed in claim 4, wherein the control unit is further configured to implement a partial reset function wherein, following a reset command, the control unit sets one or more of the steering angle (α), the leaning angle (β), and the rotating angle (ω) to zero.

* * * * *